United States Patent
Sugita et al.

(10) Patent No.: US 7,110,698 B2
(45) Date of Patent: Sep. 19, 2006

(54) ORIGINAL READING APPARATUS WITH OPENABLE AND CLOSABLE STATE AND CONTROL BASED THEREON

(75) Inventors: Shigeru Sugita, Saitama (JP); Yuji Morishige, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 10/887,835

(22) Filed: Jul. 12, 2004

(65) Prior Publication Data

US 2005/0013620 A1    Jan. 20, 2005

(30) Foreign Application Priority Data

Jul. 15, 2003    (JP)   ............................ 2003-197084
May 28, 2004    (JP)   ............................ 2004-159106

(51) Int. Cl.
    *G03G 15/22*      (2006.01)

(52) U.S. Cl. ............................ 399/130; 399/9; 399/88; 399/367; 399/380

(58) Field of Classification Search ................ 399/107, 399/130, 177, 361, 363, 364, 367, 373, 374, 399/380, 9, 88, 365; 271/121
See application file for complete search history.

(56) References Cited

U.S. PATENT DOCUMENTS

| | | | |
|---|---|---|---|
| 4,202,622 A | 5/1980 | Kawatsura et al. | ....... 355/14 C |
| H000043 H * | 4/1986 | Michaels | ....................... 355/75 |
| 5,077,579 A | 12/1991 | Shibusawa et al. | .......... 355/309 |
| 5,392,097 A * | 2/1995 | Ohtani | ......................... 399/52 |
| 5,499,807 A * | 3/1996 | Nakamura et al. | ........... 271/121 |
| 5,778,276 A * | 7/1998 | Hasegawa | ..................... 399/17 |
| 5,915,691 A * | 6/1999 | Deguchi et al. | ........ 271/265.01 |
| 6,026,252 A | 2/2000 | Kawai | .......................... 399/10 |
| 6,091,927 A | 7/2000 | Hattori et al. | ............... 399/367 |
| 6,125,305 A | 9/2000 | Sugita et al. | ................ 700/213 |
| 6,337,970 B1 | 1/2002 | Okamoto et al. | ............ 399/407 |
| 2002/0129690 A1 | 9/2002 | Yaginuma et al. | ............. 83/628 |
| 2003/0044186 A1 | 3/2003 | Kato et al. | ...................... 399/16 |

FOREIGN PATENT DOCUMENTS

| | | |
|---|---|---|
| JP | 4-196863 | 7/1992 |
| JP | 2001-92311 | 4/2001 |

\* cited by examiner

*Primary Examiner*—Hoan Tran
(74) *Attorney, Agent, or Firm*—Fitzpatrick, Cella, Harper & Scinto

(57) ABSTRACT

An original reading apparatus with an original feeding apparatus pivotally connected thereto, including a detecting device for detecting the opened state and the closed state of the original feeding apparatus, and a controller for rendering a part or the whole of the original feeding apparatus operable, on the basis of the result of the detection by the detecting device.

5 Claims, 8 Drawing Sheets

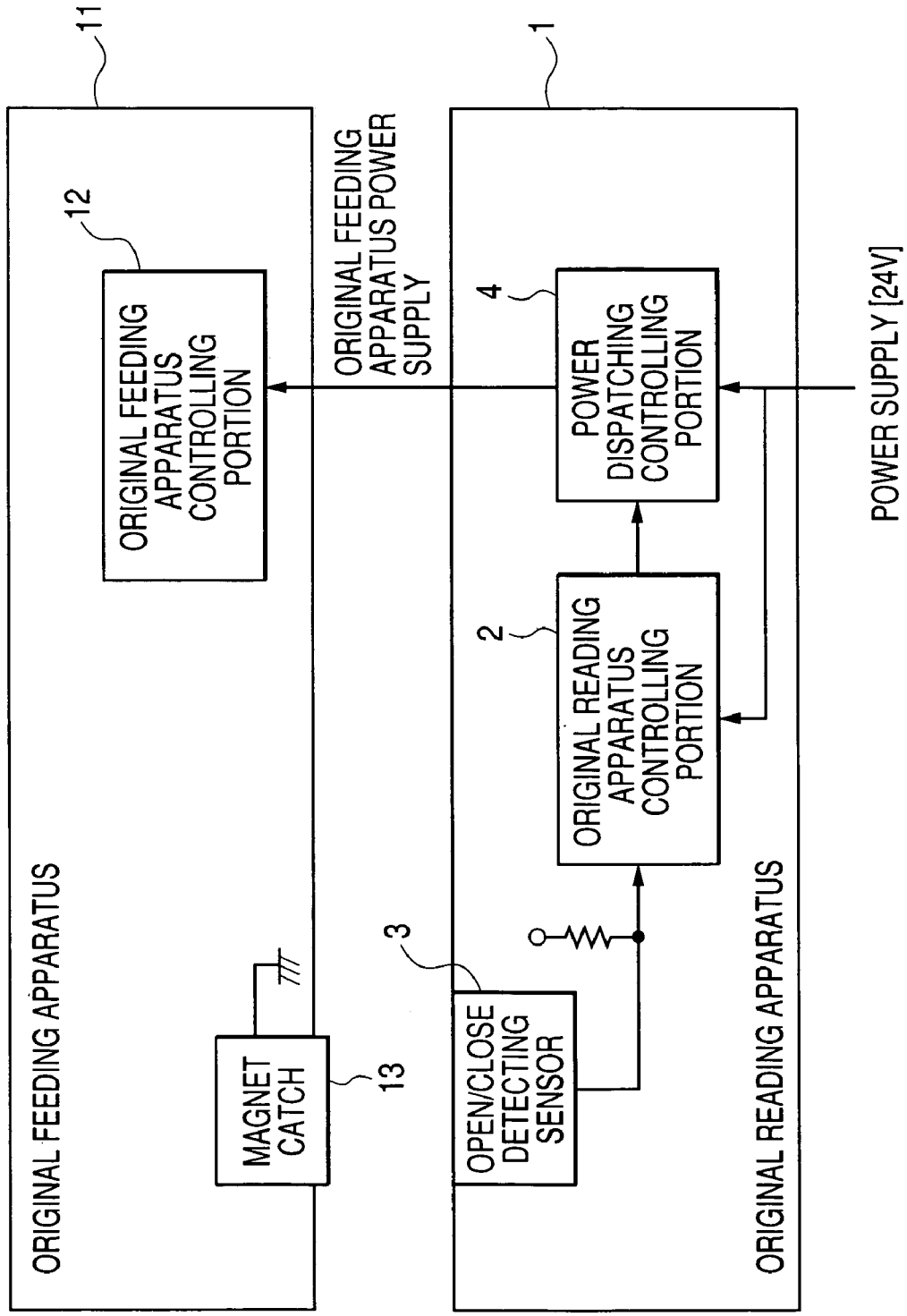

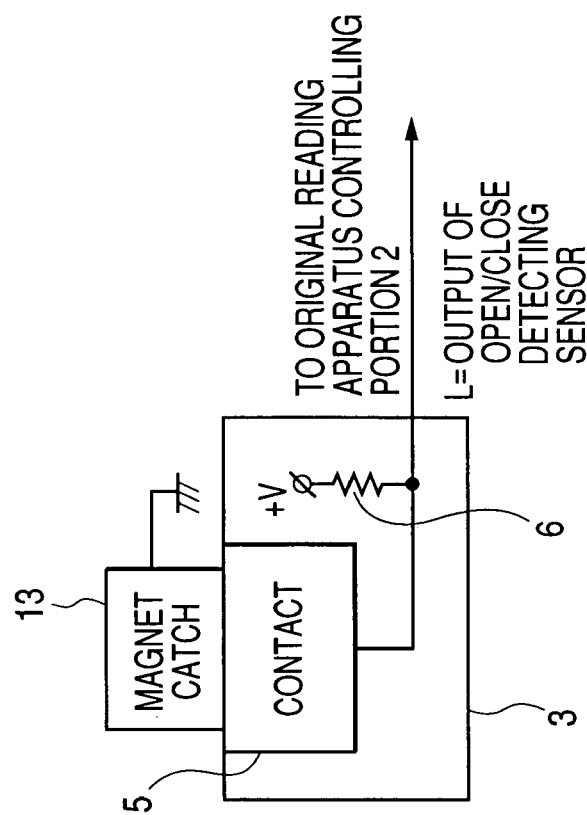
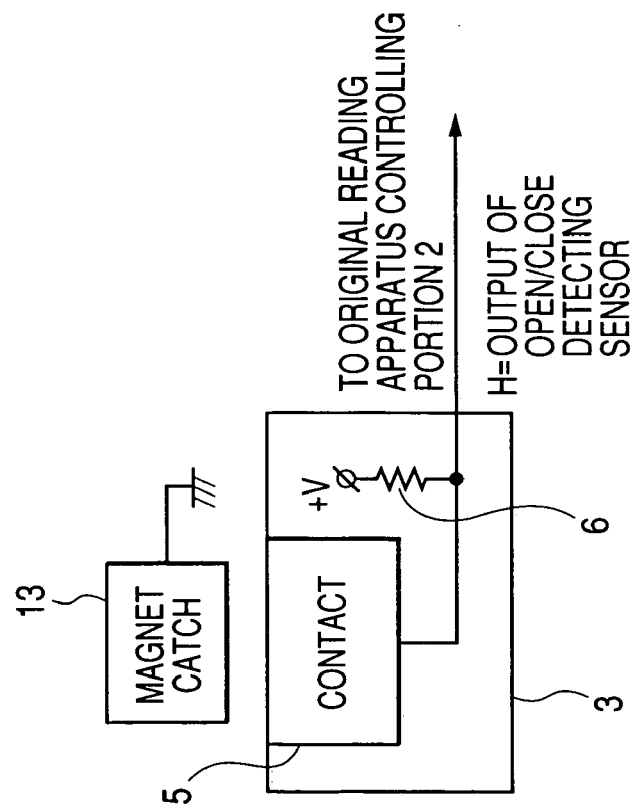

ORIGINAL READING APPARATUS WITH OPENABLE AND CLOSABLE STATE AND CONTROL BASED THEREON

This application claims priority from Japanese Patent Application Nos. 2003-197084 filed Jul. 15, 2003, 2004-159106 filed May 28, 2004, which is hereby incorporated by reference.

BACKGROUND OF THE INVENTION

1. Field of the Invention

The invention relates to an original reading apparatus with an original feeding apparatus mounted thereon.

2. Description of the Related Art

Heretofore, an original reading apparatus with an original feeding apparatus pivotally mounted thereon contains therein digital circuits for apparatus control and original reading. Generally, these digital circuits generates an unnecessary radiation wave, and if the unnecessary radiation wave is strong, it may sometimes wrongly operate other nearly apparatus and therefore, such an apparatus is provided with means for suppressing the unnecessary radiation wave (see, for example, Japanese Patent Application Laid-Open No. 2001-92311).

As one of techniques of suppressing the above-mentioned unnecessary radiation wave, there is a method of wrapping a generating source of the unnecessary radiation wave with a condition, but in this method, when the earthing of this conductor itself is insufficient, the conductor becomes an antenna, and this results in the problem that the unnecessary radiation wave is amplified. In order to solve this problem, it has been proposed to provide a mechanism for consolidating the contact between the original reading apparatus and the housing of the original feeding apparatus when the original feeding apparatus is in a closed state, thereby enhancing the earthed state of the original feeding apparatus. However, when the original feeding apparatus is in an opened state, the earthed state of the original feeding apparatus is inferior to that in the closed state and therefore, the digital circuits in the original feeding apparatus need be provided with a countermeasure for the unnecessary radiation wave.

In the original reading apparatus with the conventional original feeding apparatus pivotally mounted thereon, as described above, when the original feeding apparatus is in the opened state, the earthed state of the original feeding apparatus is inferior, and this has led to the problem that additional parts and manufacturing process for providing the digital circuits in the original feeding apparatus with the countermeasure for the unnecessary radiation waves are increased and the cost becomes higher.

Further, in spite of the original feeding apparatus being not operated during the use in a pressure plate mode, electric power is supplied to the original feeding apparatus, and this also has led to the problem that useless electric power is consumed.

SUMMARY OF THE INVENTION

The present invention has been made in view of the problems as noted above, and an object thereof is to provide an original reading apparatus in which a countermeasure for an unnecessary radiation wave can be decreased and which is inexpensive and can suppress the consumption of useless electric power.

Also, an object of the present invention to provide an original reading apparatus to which an original feeding apparatus is pivotally connected and which has detecting means for detecting the opened state and closed state of the original feeding apparatus, and control means for rendering a part or the whole of the original feeding apparatus operable, on the basis of the result of the detection by the detecting means.

BRIEF DESCRIPTION OF THE DRAWINGS

FIG. 1 is a block diagram of an original reading apparatus according to a first embodiment of the present invention.

FIGS. 2A and 2B are block diagrams showing the construction of an open/close detecting sensor in the first embodiment.

DESCRIPTION OF THE PREFERRED EMBODIMENTS

Figure 3:
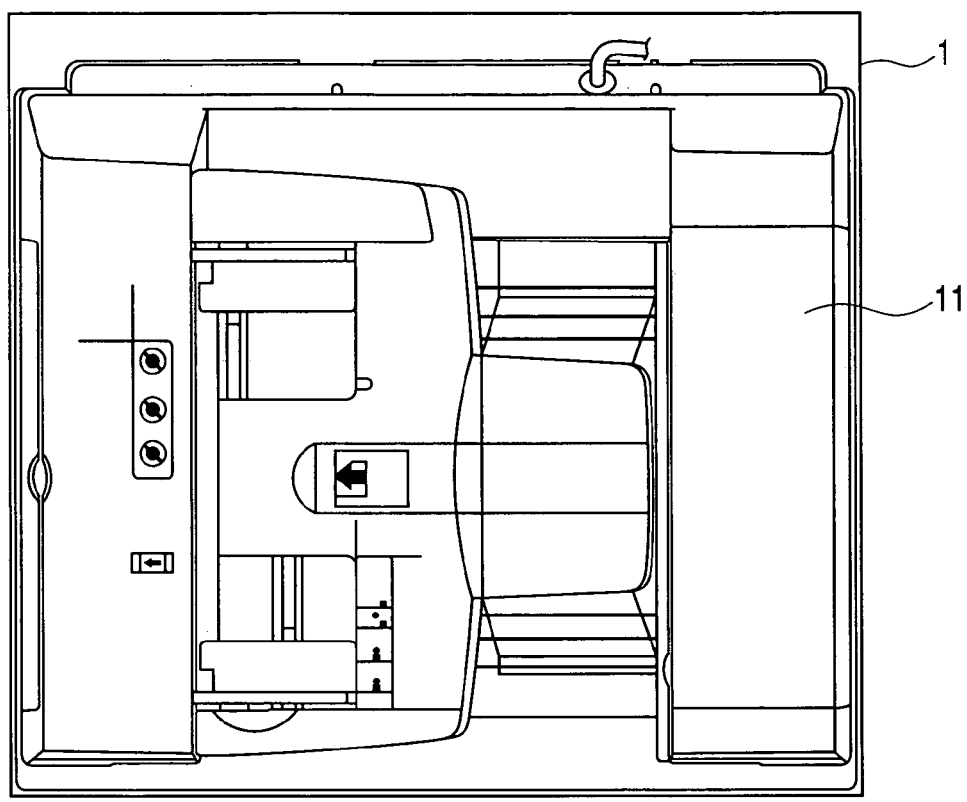
FIG. 3 is a top plan view showing the outward shape of the whole of the original reading apparatus.

Some embodiments of the present invention will hereinafter be described with reference to the drawings.

An original reading apparatus according to an embodiment of the present invention has an original feeding apparatus supported for pivotal movement relative to an original reading apparatus main body, and particularly has a pressure plate mode in which an operator manually disposes an original on the platen glass of the original reading apparatus to thereby make the original optically read, and an automatic original reading mode in which the original feeding apparatus conveys an original placed on the original placing portion of the original feeding apparatus to the reading position of the original reading apparatus to thereby effect reading.

FIG. 1 is a block diagram of an original reading apparatus according to a first embodiment of the present invention, and shows the construction of the original reading apparatus to which an original feeding apparatus is pivotally connected for opening and closing.

In FIG. 1, the original reading apparatus 1 for optically reading an original has its operation controlled by an original reading apparatus controlling portion 2. The original reading apparatus controlling portion 2 is disposed in the original reading apparatus 1. An open/close detecting sensor 3 is disposed in the original reading apparatus 1, and has a contact 5 pulled up to a power supply (not shown). The open/close detecting sensor 3 detects whether it is in contact with a magnet catch 13 opposed thereto to thereby detect whether the original feeding apparatus 11 is in a state in which it is capable of conveying the original. A power dispatching controlling portion 4 is disposed in the original reading apparatus 1, and intermits the supply of electric power from a DC power supply (not shown) to the original feeding apparatus 11 by a control signal from the original reading apparatus controlling portion 2.

The original feeding apparatus 11 conveys the original to the original reading apparatus. An original feeding apparatus controlling portion 12 is disposed in the original feeding apparatus 11, and controls the operation of the original feeding apparatus 11. The magnet catch 13 is disposed in the original feeding apparatus 11, and contacts with the open/close detecting sensor 3 in a state in which the original feeding apparatus 11 is closed. A metal piece the magnet catch 13 has is electrically connected to the gland terminal of the housing of the original feeding apparatus 11, that is, earthed, through a metallic spring. The housing referred to herein is an electrically conductive frame.

FIGS. 2A and 2B are block diagrams showing the construction of the open/close detecting sensor 3. FIG. 2A shows the relation between the open/close detecting sensor 3 and the magnet catch 13 in a state in which the original feeding apparatus 11 is opened (a state in which conveyance is impossible). FIG. 2B shows the relation between the open/close detecting sensor 3 and the magnet catch 13 in a state in which the original feeding apparatus 11 is closed (a state in which conveyance is possible). In FIGS. 2A and 2B, the contact 5 exists in the interior of the open/close detecting sensor 3 while being insulated from the surroundings thereof. The contact 5 is separated from the magnet catch 13 when the original feeding apparatus 11 is in its opened state (FIG. 2A), and is in contact with the magnet catch 13 when the original feeding apparatus 11 is in its closed state (FIG. 2B). A voltage V is applied to the contact 5 through a resistor 6. The potential between the contact 5 and the resistor 6 is inputted to the original reading apparatus controlling portion 2.

Figure 4:
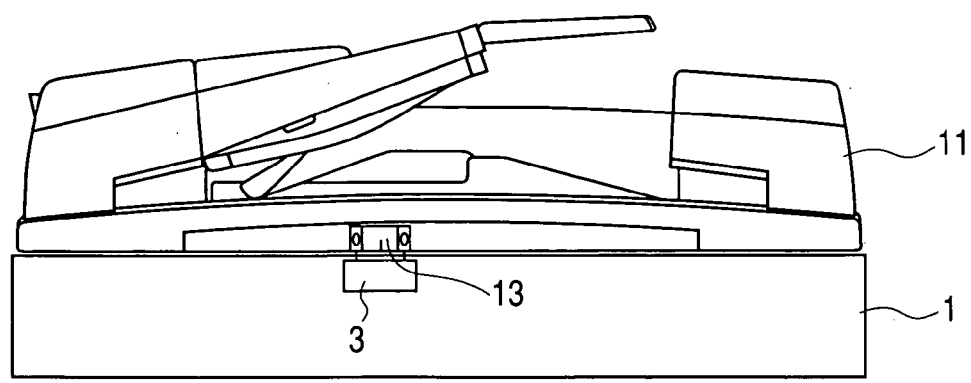
FIG. 4 is a side view showing the outward shape of the whole of the original reading apparatus.

FIGS. 3 and 4 are a top plan view (top view) and a side view, respectively, showing the outward construction of the whole of the original reading apparatus according to the present embodiment, and show the state when the original feeding apparatus 11 is in its closed state.

Figure 5A:
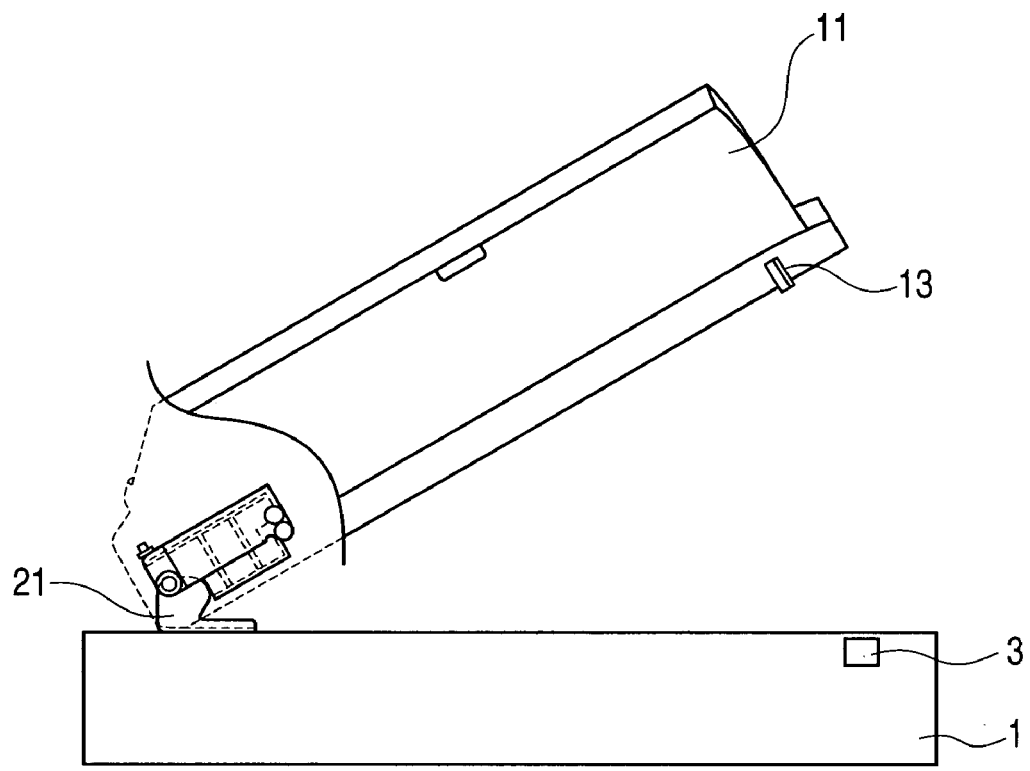
FIGS. 5A and 5B are side views showing the used state of the original reading apparatus.
Figure 5B:
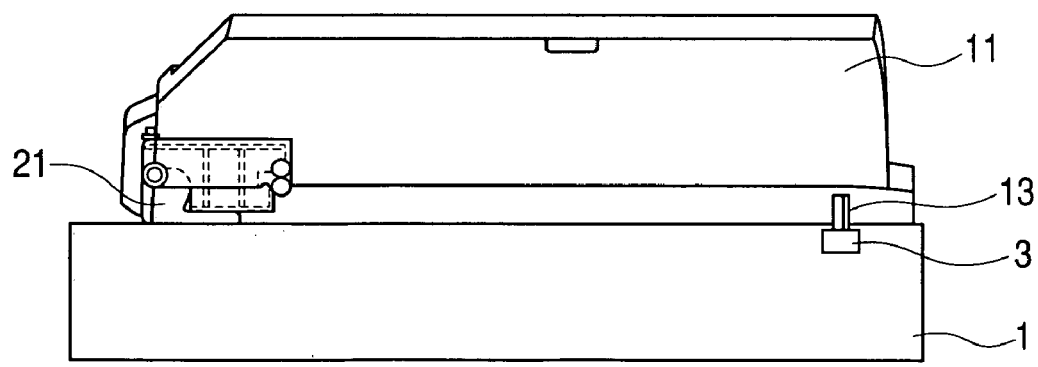

Also, FIGS. 5A and 5B are side views showing the original reading apparatus 1 according to the present embodiment. FIG. 5A shows the original reading apparatus when the original feeding apparatus 11 is in its closed state, and FIG. 5B shows the original reading apparatus when the original feeding apparatus 11 is in its closed state. In FIGS. 5A and 5B, a hinge 21 supports the original feeding apparatus 11 for pivotal movement relative to the original reading apparatus 1. The hinge 21 comprises an electrically conductive member, and is attached to the housing of the original feeding apparatus 11 and the housing of the original reading apparatus 1, and electrically couples the housing of the original feeding apparatus 11 and the housing of the original reading apparatus 1 together.

When in the original reading apparatus 1 constructed as described above, the original feeding apparatus 11 is in its closed state (a state in which the conveyance of the original is possible), as shown in FIG. 2B, the contact 5 of the open/close detecting sensor 3 and the magnet catch 13 are in contact with each other, and the output of the open/close detecting sensor 3 assumes a low level (L). At this time, when the output of the open/close detecting sensor 3 is at the low level, the original reading apparatus controlling portion 2 judges that the original feeding apparatus 11 is capable of conveying the original, and effects the power dispatching to the original feeding apparatus 11 by the power dispatching controlling portion 4.

Thereby, the original feeding apparatus controlling portion 12 assumes an active power state and generates an unnecessary radiation wave, but the housing of the original feeding apparatus 11 sufficiently keeps the contact with the housing of the original reading apparatus 1 by the magnet catch 13 or the like and therefore, the intensity of the unnecessary radiation wave to the outside of the housing is weak.

Conversely, when the original feeding apparatus 11 is in its opened state (a state in which the conveyance of the original is impossible), as shown in FIG. 2A, the contact 5 of the open/close detecting sensor 3 and the magnet catch 13 are not in contact with each other, and the output of the open/close detecting sensor 3 assumes a high level (H). At this time, when the output of the open/close detecting sensor 3 is at the high level (H), the original reading apparatus controlling portion 2 judges that the original feeding apparatus 11 is incapable of conveying the original, and stops the power dispatching to the original feeding apparatus 11 by the power dispatching controlling portion 4.

In this state, as shown in FIG. 5A, the housing of the original feeding apparatus 11 contacts with the housing of the original reading apparatus 1 only by the hinge 21, and is not in its sufficiently grounded state. At this time, however, the original feeding apparatus controlling portion 12 is in an inactive power state and therefore, does not generate the unnecessary radiation wave, nor the unnecessary radiation wave to the outside of the housing exists.

As described above, in the present embodiment, it is detected that the original feeding apparatus 11 is in its opened state (the state in which the conveyance of the original is impossible) relative to the original reading apparatus 1, and the power dispatching to the original feeding apparatus 11 is stopped, whereby when the grounding of the housing of the original feeding apparatus 11 is not sufficient, the unnecessary radiation wave is not generated from the original feeding apparatus controlling portion 12 in the original feeding apparatus, and it becomes possible to decrease the countermeasure for the unnecessary radiation wave to be provided for a digital circuit in the original feeding apparatus.

Further, when the original feeding apparatus 11 is in its opened state (the state in which the conveyance of the original is impossible), the power dispatching to the original feeding apparatus 11 is stopped and therefore, consumed electric power can be decreased. Thus, there can be constructed an original reading apparatus 1 which is inexpensive and suppresses the consumption of useless electric power.

While in the present embodiment, the contact between the open/close detecting sensor 3 and the magnet catch 13 is used as open/close detecting means, any other sensor which can detect the opened/closed state may be used.

Also, the present invention is not concerned in the operations of the original feeding apparatus 11 and the original reading apparatus 1 and therefore, the details of the operation of each apparatus need not be described.

Further, while in the present embodiment, description has been made of a case where as the power supply, a direct current of e.g. 24V is supplied from a power supply, not shown, the present invention is not restricted thereto, but the present invention may have a power supply portion from which an alternating current is supplied to the original reading apparatus 1 to thereby make a DC power supply in the interior of the original reading apparatus.

Also, in the above-described embodiment, design is made such that the open/close detecting sensor 3 which is detecting means detects whether the original feeding apparatus 11 is in a state in which it is capable of conveying the original, and when it is detected that the original feeding apparatus 11 is in a state in which it is incapable of conveying the original, the power dispatching to the original feeding apparatus 11 is stopped by the power dispatching controlling portion 4, but design may be made such that when the original feeding portion of the original feeding apparatus 11 is in its jammed state, the power dispatching to the original feeding apparatus 11 is not stopped by the power dispatching controlling portion 4.

Further, while the open/close detecting sensor 3 detects whether the original feeding apparatus 11 is opened or closed about a pivotal movement supporting portion, design may be made such that the open/close detecting sensor 3 detects a state in which the original feeding apparatus 11 is opened by a predetermined angle about the pivotal movement supporting portion, or design may be made such that the open/close detecting sensor 3 detects whether in the closed state of the original feeding apparatus 11, a predetermined region is in contact with the original feeding apparatus 11.

Or there may be adopted a construction which has a contact intermittently opened and closed in response to the opening and closing of the original feeding apparatus 11, and this contact may be of a construction in which in its closed state, it contacts to thereby dispatch electric power to the original feeding apparatus 11, and in its opened state, it is in non-contact and stops the power dispatching to the original feeding apparatus 11.

The original reading apparatus 1 of such a construction as described above has a construction in which the reading portion is moved to thereby read the original placed on the platen glass as previously described, and the original feeding apparatus 11 has a construction for separating a bundle of originals placed on an original tray and conveying it onto the platen glass, and thereafter stopping it, and discharging it to a discharging portion when the reading of the original is finished.

Also, when the original reading apparatus 1 has the construction in which the reading portion is moved to thereby read the original placed on the platen glass, and the original feeding apparatus 11 is used, design may be made such that the reading portion is fixed, the original feeding apparatus 11 conveys the original at a constant speed on the surface of the platen glass opposed to the reading portion, and the original is read by the reading portion while the original is conveyed on the platen glass.

The original reading apparatus of the present invention is an original reading apparatus with an original feeding apparatus pivotally connected thereto for opening and closing, having a basic construction having detecting means for detecting the operating state of the original feeding apparatus, and a power dispatching controlling portion for controlling power dispatching to the original feeding apparatus, wherein the power dispatching controlling portion is controlled in conformity with the result of the detection by the detecting means, but can be constructed as follows relative to the above-described construction as described above.

The detecting means detects whether the original feeding apparatus is in a state in which it is capable of conveying the original, and stops the power dispatching to the original feeding apparatus by the power dispatching controlling portion when it is detected by this detecting means that the original feeding apparatus is in a state in which it is incapable of conveying the original.

The detecting means detects whether the original feeding apparatus is in the state in which it is capable of conveying the original, and design is made such that when it is detected by the detecting means that the original feeding apparatus is in the state in which it is incapable of conveying the original, the power dispatching to the original feeding apparatus is stopped, and when the original feeding apparatus is in a jammed state, the power dispatching to the original feeding apparatus is not stopped by the power dispatching controlling portion.

Design is made such that the detecting means is open/close detecting means for detecting whether the original feeding apparatus is opened or closed about the pivotal movement supporting portion.

The open/close detecting means is designed to detect a state in which the original feeding apparatus is opened by a predetermined angle about the pivotal movement supporting portion.

The open/close detecting means is designed to detect whether in the closed state of the original feeding apparatus, this original feeding apparatus and a predetermined region are in contact with each other.

The original reading apparatus with the original feeding apparatus pivotally connected thereto for opening and closing has a contact intermittently closed and opened in response to the opening and closing of the original feeding apparatus, and this contact in its closed state contacts to thereby dispatch electric power to the original feeding apparatus, and in its opened state, it is in non-contact to thereby stop the power dispatching to the original feeding apparatus.

The original reading apparatus is designed to have a construction in which the reading portion is moved to thereby read the original placed on the platen glass, and the original feeding apparatus is designed to have a construction which separates a bundle of originals placed on the original tray and conveys it onto the platen glass, and thereafter stops and discharges the original to the discharging portion when the reading of the original is finished.

The original reading apparatus is designed to have a construction in which the reading portion is moved to thereby read the original placed on the platen glass, and when the original feeding apparatus is used, the reading portion is fixed, and the original feeding apparatus is designed to convey the original at a predetermined speed on the platen glass opposed to the reading portion.

As described above, according to the present embodiment, there is the effect that the countermeasure for the unnecessary radiation wave can be decreased, and the apparatus is inexpensive and can suppress the consumption of useless electric power.

That is, it can be detected that the original feeding apparatus is in its opened state (the state in which the conveyance of the original is impossible) relative to the original reading apparatus, and the power dispatching to the original feeding apparatus can be stopped and thus, when the grounding of the housing of the original feeding apparatus is not sufficient, the unnecessary radiation wave is not generated from the original feeding apparatus controlling portion in the interior of the original feeding apparatus, and it becomes possible to decrease the countermeasure for the unnecessary radiation wave to be provided for the digital circuit in the original feeding apparatus.

Further, when the original feeding apparatus is in its opened state (the state in which the conveyance of the original is impossible), the power dispatching to the original feeding apparatus can be stopped to thereby decrease consumed electric power.

Figure 6:
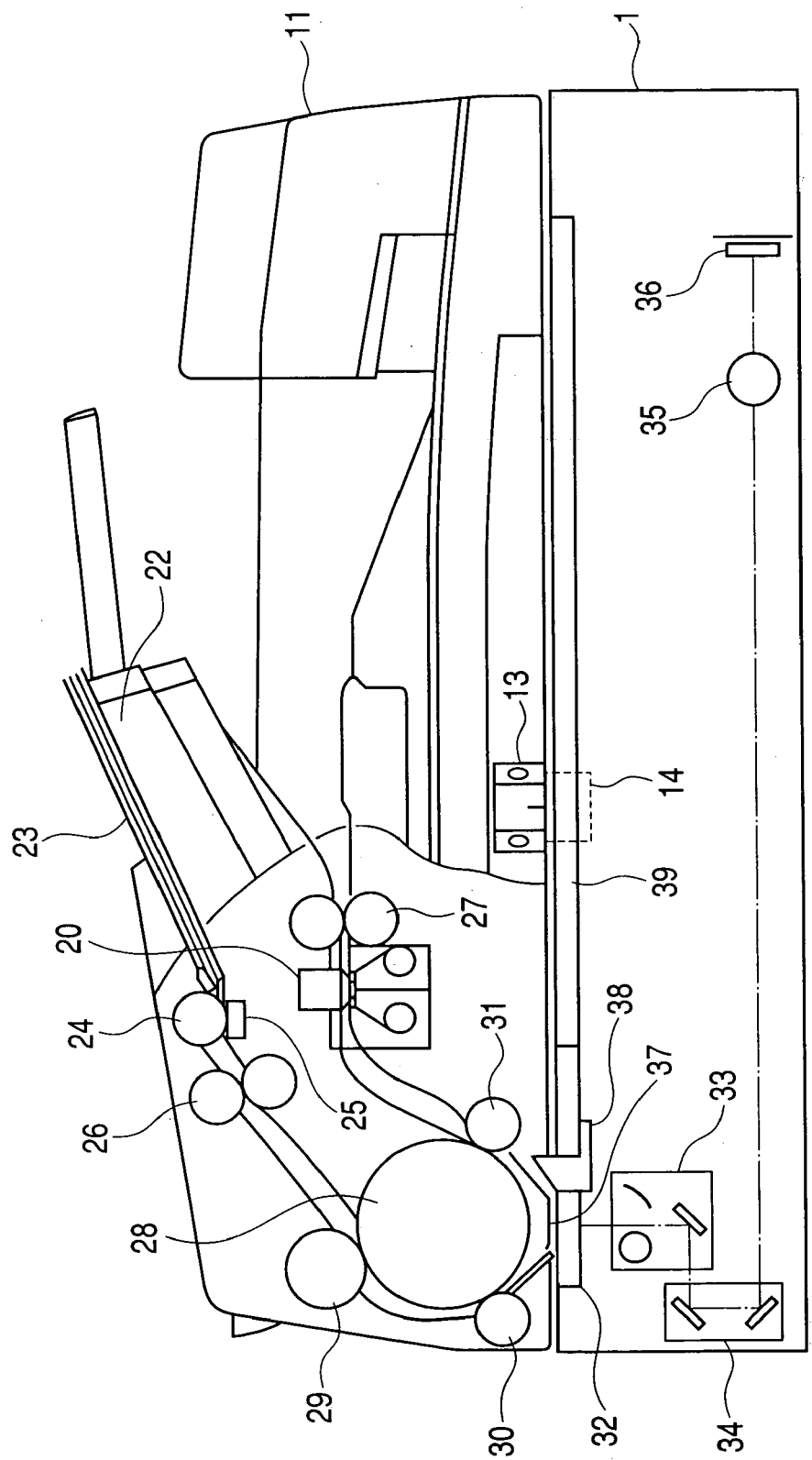
FIG. 6 is a side view showing the internal construction of an original reading apparatus according to a second embodiment of the present invention.

Description will now be made of an original reading apparatus according to a second embodiment of the present invention. FIG. 6 is a cross-sectional view schematically showing the internal construction of the original reading apparatus 1 according to the present embodiment to be incorporated in an image forming apparatus such as a copying machine or a facsimile apparatus, and an original reading portion 20, etc. are disposed in an original feeding apparatus 11 so that both sides of an original can be read at a time. A top view and a side view of the original reading apparatus according to the present embodiment are similar to FIGS. 3, 5A and 5B, and therefore need not be described. As in the aforedescribed first embodiment, the original feeding apparatus 11 is earthed to the original reading apparatus 1 through a hinge 21.

The original reading apparatus 1 according to the present embodiment has the original feeding apparatus 11 for moving the original, first image reading means for reading an image on the front side of an original conveyed on a flow reading original glass stand 32 or the front side of an original placed on a fixed reading original glass stand 39, and second image reading means for reading an image on the back side of the original while moving the original, and when a both-side image original is to be read, the original is conveyed at the scanning speed of the image reading means, and the images on the front side and the back side of the original are read by the first image reading means and the second image reading means, respectively. Also, when a one-side image original is to be read, the image thereon is read by the first image reading means alone.

The first image reading means reads while moving an exposing portion in the original reading apparatus 1 and an original 23 relative to each other, and the second image reading means reads information on the original while moving an original reading portion 20 and the original 23 relative to each other. The original reading portion 20 is comprised of an LED array which provides a light source, not shown, a rod lens array and a contact image sensor (CIS).

The originals 23 set on an original tray 22 are fed one by one by an original feeding roller 24 forming a pair with a separating pad 25, and the conveyance thereof is effected by a pair of intermediate rollers 26, a large roller 28, a first driven roller 29 and a second driven roller 30. The first driven roller 29 and the second driven roller 30 are provided in opposed relationship with the large roller 28.

The original conveyed by the large roller 28 and the second driven roller 30 passes between the flow reading original glass stand 32 and an original guide plate 37, and is again conveyed by the large roller 28 and a third driven roller 31 with the aid of a jump stand 38. At this time, between the flow reading original glass stand 32 and the original guide plate 37, the original 38 is conveyed while being brought into contact with the flow reading original glass stand 32 by the original guide plate 37.

The original 23 is exposed to light by the exposing portion 33 when it passes on the flow reading original glass stand 32. The exposing portion 33 transmits to a mirror unit 34 original image information reflected from the original 23 by the original 23 being exposed to light, and the original image information is passed through and condensed by a lens 35, and is converted into an electrical signal by an image reading sensor portion (CCD sensor) 36.

The image on the front side of the original 23 is read in the above-described process. Next, the original 23 conveyed by the large roller 28 and the third driven roller 31 has the image on its back side read by the original reading portion 20 in the process of being conveyed in a direction toward a pair of original discharging roller 27, and the read image is converted into an electrical signal, and thereafter is transmitted to the original reading apparatus 1. Thereafter, the original 23 is discharged to the outside of the original feeding apparatus 11 by the pair of original discharging rollers 27.

In the case of a one-side original, the reading of the original image by the original reading portion 20 is not effected, but the original is intactly discharged to the outside of the original feeding apparatus 11.

As described above, during the reading of a both-side original, the simultaneous reading of the both-side images by the CCD sensor 36 of the image reading apparatus 1 and the CIS of the original reading portion 20 is effected at the original scanning speed of a one-to-one magnification optical system using the CIS, and during the reading of a one-side original, the image reading by the CCD sensor 36 of the original reading apparatus 1 is effected at the original scanning speed of a reduction optical system using the CCD sensor, whereby the one-side image can be read at a scanning speed higher than during the both-side reading.

Also, design is made such that in a case where whether the original to be read is a one-side image original or a both-side image original is not designated, the reading of the first original is effected with the CIS and the CCD sensor driven at the original scanning speed of the one-to-one magnification optical system using the CIS, and in a case where the first original is a one-side image original, reading is thereafter effected on the second and subsequent originals with the CCD sensor driven at the scanning speed of the reduction optical system using the CCD sensor, and in a case where the first original is a both-side image original, reading is thereafter continuedly effected also on the second and subsequent originals with the CCD sensor and the CIS driven at the original scanning speed of the one-to-one magnification optical system using the CIS.

According to such a construction, there can be realized an image reading apparatus, a controlling method therefore and an image forming apparatus which can effect image reading at an optimum original scanning speed during both-side original reading and during one-side original reading, and can also effect image reading at an optimum original scanning speed in a case where an original not designated as to whether it is a one-side image original or a both-side image original, and which are high in productivity and can accomplish efficient image reading.

When the original feeding apparatus 11 is not used, the exposing portion 33 which is first reading means and a mirror unit 34 are moved relative to the original placed on the fixed reading original glass stand 39 to thereby read original image information, which is then passed through and condensed by the lens 35 and is converted into an electrical signal by the image reading sensor portion 36.

Figure 7:
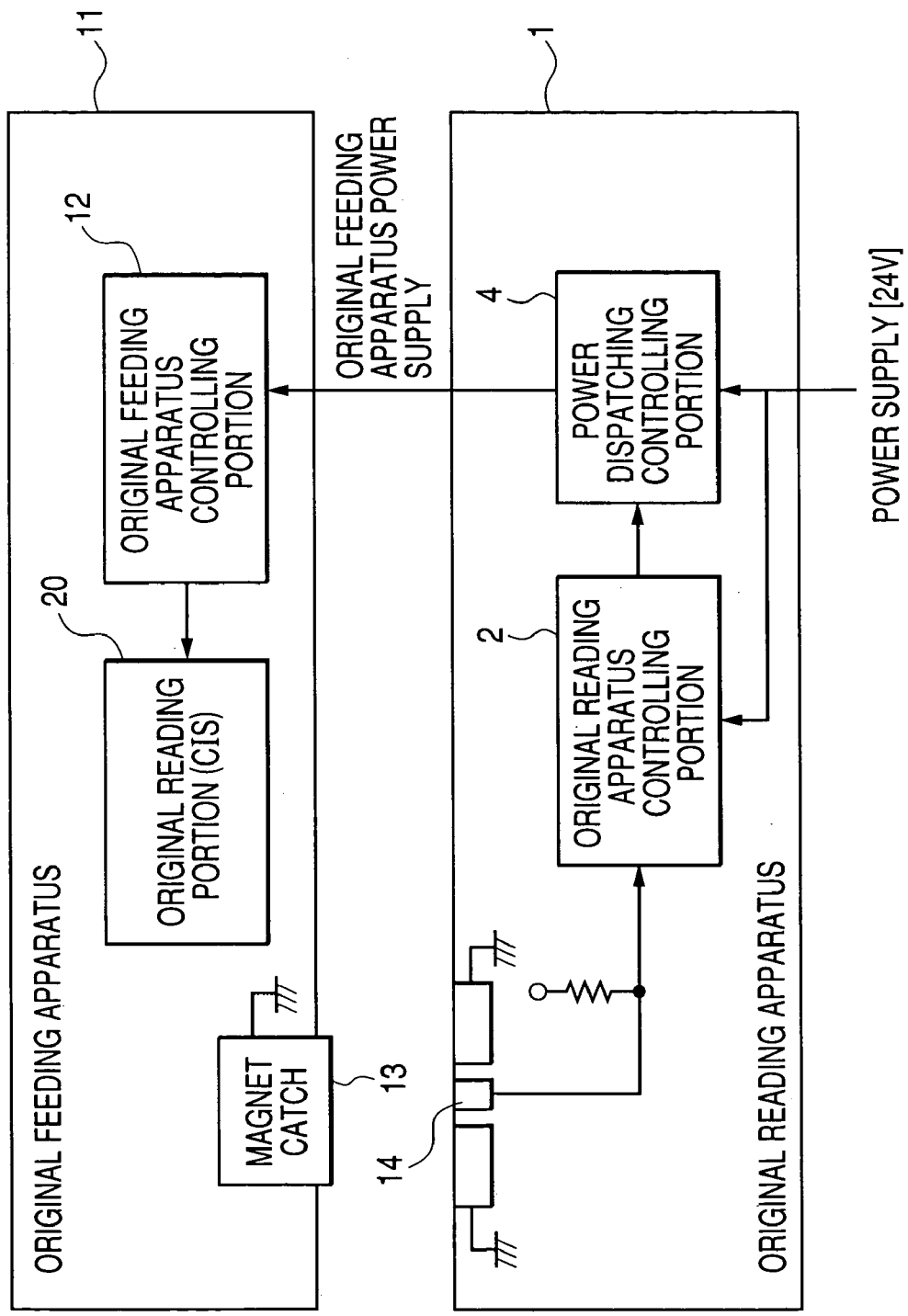
FIG. 7 is a block diagram of the original reading apparatus according to the second embodiment.

FIG. 7 is a block diagram of the original reading apparatus according to the present embodiment. The original reading apparatus 1 optically reads the original. An original reading apparatus controlling portion 2 is disposed in the original reading apparatus 1, and controls the operation of the original reading apparatus 1. An open/close detecting sensor (open/close detecting means) 14 is disposed in the original reading apparatus 1, and has a contact 5 pulled up to a power supply (not shown). The open/close detecting sensor (open/ close detecting means) 14 detects whether it is in contact with a magnet catch 13 opposed thereto, thereby detecting whether the original feeding apparatus 11 is in a state in which the conveyance of the original is possible.

Figure 8A:
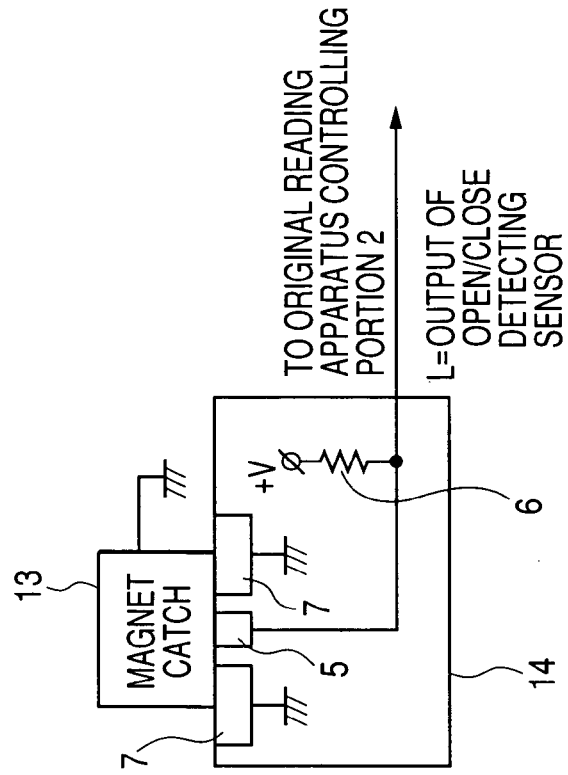
FIGS. 8A and 8B are block diagrams showing the construction of an open/close detecting sensor in the second embodiment.
Figure 8B:
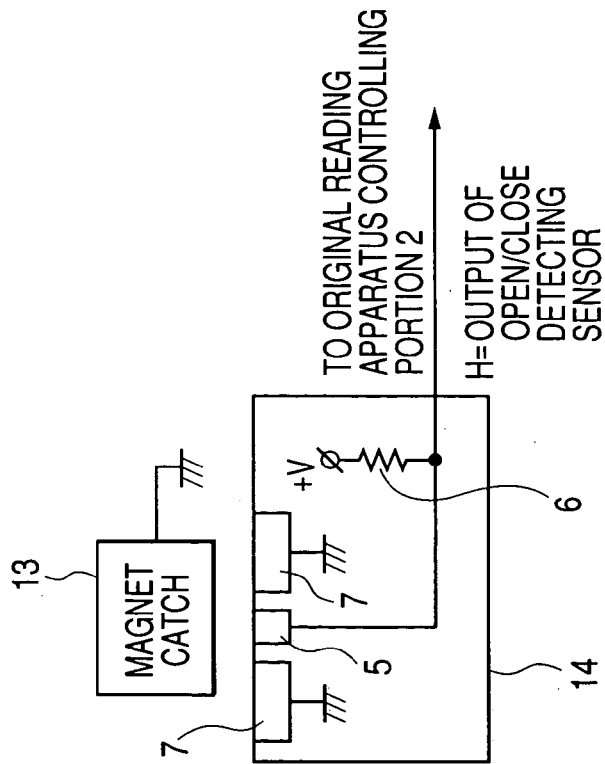

The open/close detecting sensor 14 has the contact 5 and contacts 7, as shown in FIGS. 8A and 8B. The contact 5 is insulated from the surroundings thereof in the interior of the open/close detecting sensor 14. A voltage V is applied to the contact 5 through a resistor 6. The potential between the contact 5 and the resistor 6 is inputted to the original reading apparatus controlling portion 2. The contacts 7 are earthed to the housing of the original reading apparatus 1. Design is made such that when the magnet catch 13 is in contact with the contact 5, the magnet catch 13 also contacts with the contacts 7, and that when the magnet catch 13 is separate from the contacts 7, the magnet catch 13 is also separate from the contact 5.

A power dispatching controlling portion 4 is disposed in the original reading apparatus 1 and intermits the supply of electric power from a DC power supply (not shown) to the original feeding apparatus 11 by a control signal from the original reading apparatus controlling portion 2.

The original feeding apparatus 11 conveys the original to the original reading apparatus 1. An original feeding apparatus controlling portion 12 is disposed in the original feeding apparatus 11, and controls the operation of the original feeding apparatus 11. An original reading portion (CIS) 20 transmits read image data to the original reading apparatus 11 through the original feeding apparatus controlling portion 12.

This original feeding apparatus controlling portion 12 has a CPU, which is operated by a high frequency clock of e.g. 20 MHz, and further effects the transmission and reception of data with peripheral devices such as a memory and I/O and therefore may become a cause generating an unnecessary radiation wave. Particularly when the CPU operates with the original feeding apparatus 11 being in its opened state, the original feeding apparatus 11 itself is liable to become an antenna, and the intensity of the unnecessary radiation wave tends to heighten.

Also, in the original reading portion 20 connected to the original feeding apparatus controlling portion 12, image reading and image data forwarding are effected in synchronism with a clock inputted from the CPU during the original reading operation. This clock is a high frequency clock of e.g. 30 MHz, and an unnecessary radiation wave is liable to be generated from a transmitting path for transmitting this clock, and a forwarding path for image data forwarded in synchronism with this clock.

Unusually, consideration is given so that in a state in which image reading is not effected, the clock may be stopped and the unnecessary radiation wave may not be generated, and particularly no problem may be posed in a state in which the original feeding apparatus has been intentionally opened.

However, if in a state in which the original feeding apparatus 11 is not sufficiently earthed, original reading is effected by the original feeding apparatus 11, the original feeding apparatus 11 is liable to become an antenna, and a clock supplied to the original reading portion 20, and the intensity of an unnecessary radiation wave attributable to image data forwarding synchronized with the clock tend to heighten.

The magnet catch 13 is disposed in the original feeding apparatus 11, and contacts with the open/close detecting sensor 14 in a state in which the original feeding apparatus 11 is closed. A metal piece the magnet catch 13 has is earthed to the housing of the original feeding apparatus 11 through a metallic spring. The magnet catch 13 is supported by a spring and therefore that surface of the magnet catch 13 which is opposed to the contact 5 and the contacts 7 is designed to be displaced to a certain degree. Accordingly, if the upper surface of the contact 5 is set somewhat higher than the upper surface of the contact 7, the magnet catch 13 contacts with one of the two contacts 7 without fail when the magnet catch 13 is in contact with the contact 5, and the housing of the original feeding apparatus 11 and the housing of the original reading apparatus 1 become electrically coupled together through the magnet catch 13.

When the original feeding apparatus 11 is in its open state (the state in which the conveyance of the original is impossible), the contact 5 of the open/close detecting sensor 14 and the magnet catch 13 are separate from each other (FIG. 8A), and the output of the open/close detecting sensor 14 assumes a high level (H). When the original feeding apparatus 11 is in its closed state (the state in which the conveyance of the original is possible), the contact 5 of the open/close detecting sensor 14 and the magnet catch 13 contact with each other (FIG. 8B), and the output of the open/close detecting sensor 14 assumes a low level (L). When the output of the open/close detecting sensor 14 is at the low level (L), the original reading apparatus controlling portion 2 judges that the original feeding apparatus 11 is capable of conveying the original, and effects power dispatching to the original feeding apparatus 11 by the power dispatching controlling portion 4.

Thereby, the original feeding apparatus controlling portion 12 assumes an active power state and the CPU is operated by a high frequency clock. Further, during image reading, it outputs an image reading clock and an image data forwarding clock. When the output of the open/close detecting sensor 14 is at the low level (L), the magnet catch 13 is in contact with the contact 5 and is also in contact with the contacts 7, and the housing of the original feeding apparatus 11 is earthed to the housing of the original reading apparatus 1 through the magnet catch 13 and the contacts 7. Also, the housing of the original feeding apparatus 11 is earthed to the housing of the original reading apparatus 1 through the hinge 21. Accordingly, the antenna effect by the original feeding apparatus 11 is little, and the unnecessary radiation wave to the outside of the housing is suppressed, and the influence on the malfunctioning of other apparatus can be suppressed.

When the output of the open/close detecting sensor 14 is at the high level (H), the original reading apparatus controlling portion 2 judges that the original feeding apparatus 11 is incapable of conveying the original, and stops the power dispatching to the original feeding apparatus 11 by the power dispatching controlling portion 4.

As described above, according to the present embodiment, only when it is detected that side of the original feeding apparatus 11 on which the magnet catch 13 is provided is earthed to the original reading apparatus 1, the power dispatching to the original feeding apparatus 11 is effected and therefore, when the original feeding apparatus 11 is apparently closed, but electrically that side of the original feeding apparatus 11 on which the magnet catch 13 is provided is not earthed, the unnecessary radiation wave can be prevented from going out by the antenna effect of the original feeding apparatus 11.

As described above, according to the present embodiment, there is the effect that the countermeasure for the unnecessary radiation wave can be decreased and the apparatus is inexpensive and can suppress the consumption of useless electric power.

That is, it can be detected that the original feeding apparatus is in its opened state (incapable of conveying the original) relative to the original reading apparatus, and the power dispatching to the original feeding apparatus can be stopped, and when the grounding of the housing of the original feeding apparatus is not sufficient, the unnecessary radiation wave is not generated from the original feeding apparatus controlling portion in the interior of the original feeding apparatus, and further from the image reading sensor portion, and it becomes possible to decrease the countermeasure for the unnecessary radiation wave provided for the digital circuit in the original feeding apparatus.

Further, when the original feeding apparatus is in its opened state (incapable of conveying the original), the power dispatching to the original feeding apparatus can be stopped to thereby decrease consumed electric power.

Figure 9:
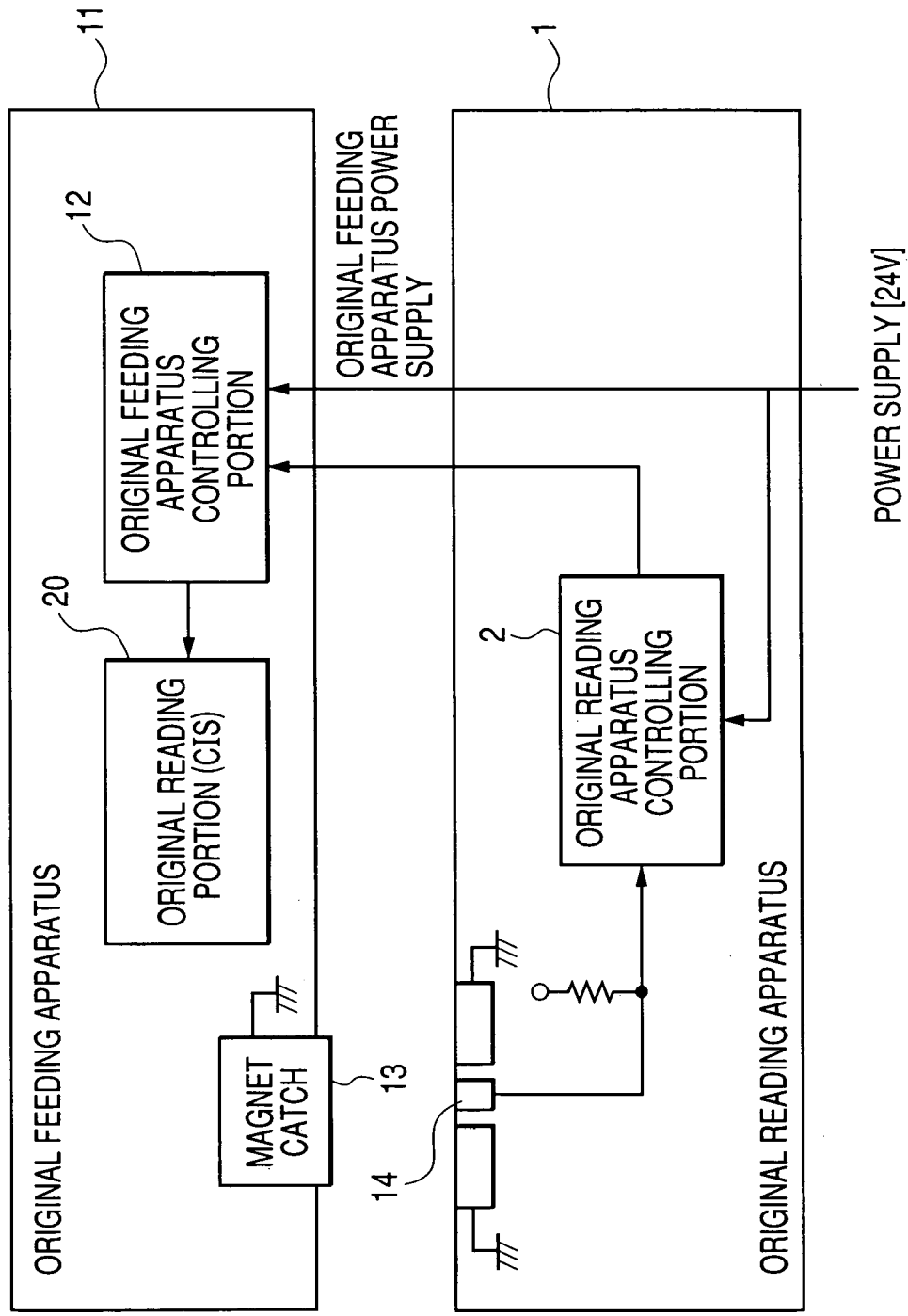
FIG. 9 is a block diagram of an original reading apparatus according to a third embodiment of the present invention.

Description will now be made of an original reading apparatus according to a third embodiment of the present invention. FIG. 9 is a block diagram of the original reading apparatus according to the present embodiment. While in the second embodiment, the power dispatching to the original feeding apparatus is stopped in conformity with the detection of the fact that the original feeding apparatus is in its opened state relative to the original reading apparatus, in the present embodiment, the driving of the original reading portion in the original feeding apparatus is prohibited in conformity with the detection of the fact that the original feeding apparatus is in its opened state relative to the original reading apparatus. In the other points, the present embodiment is similar to the second embodiment.

When in the original reading apparatus according to the present embodiment, the original feeding apparatus 11 is in its opened state, the contact 5 of the open/close detecting sensor 14 and the magnet catch 13 are separate from each other (FIG. 8A), and the output of the open/close detecting sensor 14 assumes a high level (H). When the original feeding apparatus 11 is in its closed state, the contact 5 of the open/close detecting sensor 14 and the magnet catch 13 are in contact with each other (FIG. 8B), and the output of the open/close detecting sensor 14 assumes a low level (L).

When the output of the open/close detecting sensor 14 is at the low level (L), the original reading apparatus controlling portion 2 outputs to the original feeding apparatus controlling portion 12 a signal for driving the original reading portion 20 at timing whereat the other original reading starting conditions are satisfied. That is, when the output of the open/close detecting sensor 14 is at the low level (L), the original reading apparatus controlling portion 2 permits the driving of the original reading portion 20 as long as the other original reading starting conditions are satisfied.

Thereby, during image reading, the original feeding apparatus controlling portion 12 outputs an image reading clock and an image data forwarding clock to the original reading portion 20. When the output of the open/close detecting sensor 14 is at the low level (L), the magnet catch 13 is in contact with the contact 5 and is also in contact with the contacts 7, and the housing of the original feeding apparatus 11 is earthed to the housing of the original reading apparatus 1 through the magnet catch 13 and the contacts 7. Also, the housing of the original feeding apparatus 11 is earthed to the housing of the original reading apparatus through the hinge 21. Accordingly, the antenna effect by the original feeding apparatus 11 is little, and the unnecessary radiation wave to the outside of the housing is suppressed, and the influence on the malfunctioning of other apparatus can be suppressed.

When the output of the open/close detecting sensor 14 is at the high level (H), even if the other original reading starting conditions are satisfied, the original reading apparatus controlling portion 2 does not output to the original feeding apparatus controlling portion 12 the signal for driving the original reading portion 20. That is, when the output of the open/close detecting sensor 14 is at the high level (L), the original reading apparatus controlling portion 2 prohibits the driving of the original reading portion 20.

As described above, according to the present embodiment, only when it is detected that that side of the original feeding apparatus 11 on which the magnet catch 13 is provided is earthed to the original reading apparatus 1, the driving of the original reading portion 20 is permitted and therefore, when the original feeding apparatus 11 is apparently closed, but electrically that side of the original feeding apparatus 11 on which the magnet catch 13 is provided is not earthed, the unnecessary radiation wave can be prevented from going out by the antenna effect of the original feeding apparatus 11.

Design may be made such that when the output of the open/close detecting sensor 14 is at the low level (L), the original reading apparatus controlling portion 2 outputs to the original feeding apparatus controlling portion 12 a signal for permitting the driving of the original reading portion 20, and when the output of the open/close detecting sensor 14 is at the high level (H), the original reading apparatus controlling portion 2 outputs to the original feeding apparatus controlling portion 12 a signal for prohibiting the driving of the original reading portion 20, and the original feeding apparatus controlling portion 12 controls the driving of the original reading portion 20 in the original feeding apparatus 11 on the basis of the permitting signal and the prohibiting signal.

What is claimed is:

1. An original reading apparatus with an original feeding apparatus pivotally connected thereto, comprising:
   a detecting device for detecting an opened state and a closed state of said original feeding apparatus;
   a controller for rendering a part or a whole of said original feeding apparatus operable, on the basis of a result of detection by said detecting device; and
   a power dispatching controlling device for controlling power dispatching to said original feeding apparatus,
   wherein said controller causes said power dispatching controlling device to effect power dispatching to said original feeding apparatus when said detecting device detects the closed state, and causes said power dispatching controlling device to stop the power dispatching to said original feeding apparatus when said detecting device detects the opened state.

2. An original reading apparatus with an original feeding apparatus pivotally connected thereto, comprising:
   a detecting device for detecting an opened state and a closed state of said original feeding apparatus; and
   a controller for rendering a part or a whole of said original feeding apparatus operable, on the basis of a result of detection by said detecting device,
   wherein an original reading device for reading an original conveyed by said original feeding apparatus is provided in said original feeding apparatus, and said controller permits a driving of said original reading device when said detecting device detects the closed state, and prohibits the driving of said original reading device when said detecting device detects the opened state.

3. An original reading apparatus according to claim 2, wherein said detecting device detects the closed state when a first contact provided at a predetermined position in said original feeding apparatus is in contact with a second contact provided at a predetermined position in said original reading apparatus, and detects the opened state when the first contact of said original feeding apparatus is out of contact with the second contact of said original reading apparatus.

4. An original reading apparatus according to claim 3, wherein the first contact of said original feeding apparatus is electrically connected to an electrically conductive housing of said original feeding apparatus, a voltage is applied to the second contact of said original reading apparatus through a resistor, potential between said resistor and said second contact is inputted to said controller, and said controller discriminates whether said first contact and said second contact are in contact with each other, on the basis of the potential between said resistor and said second contact.

5. An original reading apparatus according to claim 4, wherein a third contact capable of contacting with the first contact of said original feeding apparatus is provided in said original reading apparatus, said third contact is electrically connected to an electrically conductive housing of said original reading apparatus, and when the first contact of said original feeding apparatus and the third contact of said original reading apparatus are in contact with each other, the first contact of said original feeding apparatus and the third contact of said original reading apparatus are electrically connected together.

* * * * *

UNITED STATES PATENT AND TRADEMARK OFFICE
CERTIFICATE OF CORRECTION

PATENT NO. : 7,110,698 B2 Page 1 of 1
APPLICATION NO. : 10/887835
DATED : September 19, 2006
INVENTOR(S) : Shigeru Sugita et al.

It is certified that error appears in the above-identified patent and that said Letters Patent is hereby corrected as shown below:

COLUMN 1:
Line 19, "generates" should read --generate--.
Line 21, "nearly" should read --nearby--.

COLUMN 2:
Line 1, "to provide" should read --is to provide--.

COLUMN 8:
Line 6, "roller 27," should read --rollers 27,--.

COLUMN 12:
Line 10, "level (L)," should read --level (H),--.

Signed and Sealed this

Twenty-ninth Day of May, 2007

JON W. DUDAS
*Director of the United States Patent and Trademark Office*